United States Patent [19]

Roedseth

[11] Patent Number: 4,684,422

[45] Date of Patent: Aug. 4, 1987

[54] TRANSFER APPARATUS FOR TIRE CARCASSES AND TIRE BANDS

[75] Inventor: John K. Roedseth, Bissen, Luxembourg

[73] Assignee: The Goodyear Tire & Rubber Company, Akron, Ohio

[21] Appl. No.: 771,967

[22] Filed: Sep. 3, 1985

[51] Int. Cl.$^4$ ............................................. B29D 30/08
[52] U.S. Cl. .................................. 156/126; 156/406.2
[58] Field of Search ..................... 156/406.2, 396, 126, 156/127; 269/21

[56] References Cited

FOREIGN PATENT DOCUMENTS 1149723 6/1966 United Kingdom .

Primary Examiner—Michael Ball
Attorney, Agent, or Firm—T. P. Lewandowski

[57] ABSTRACT

A transfer apparatus for an uncured cylindrical tire component and which comprises a hollow cylindrical housing having a pair of annular sealing and gripping means, preferably air operable bladders, located one at each end of the housing. The housing has a vacuum port located between the two annular gripping and sealing means so after said means seal against the outer side of the cylindrical component, air is evacuated through said port to retain the component in the housing.

The invention also describes a method of transporting a cylindrical tire component using the above apparatus.

12 Claims, 8 Drawing Figures

TRANSFER APPARATUS FOR TIRE CARCASSES AND TIRE BANDS

This invention relates to an apparatus for transferring a cylindrical band of elastomeric material to a tire building drum, or from one tire building drum to another building drum.

When building radial carcass tires, it is common for the tires to be built in two stages; at the first stage a cylindrical tire carcass band is built on a drum, and this carcass band is then transferred to a second stage operation, where it is shaped into a toroidal configuration and the breaker belts and tread are applied around the outer surface of the toroidal carcass. During transportation between the two building stages the carcass bands sometimes collapse inwardly and consequently, it is necessary to reshape the carcass band before fitting onto the second stage building drum.

One aspect of the present invention is to remove the necessity of reshaping the carcass band before the second stage building operation.

A tire carcass band generally comprises a number of components for example, an inner liner, carcass plies, beads, apexes, sidewalls. In certain circumstances it may be necessary to transport the inner liner and/or carcass plies after they have been formed into a cylindrical configuration, but before some other, more inherently strong components, have been added. Since these components have very little inherent strength they are difficult to handle without losing their desired shape.

A second aspect of the present invention is to provide a transfer apparatus that can also handle flimsy cylindrical components.

Accordingly there is provided a transfer apparatus for the transfer of an uncured tire component from one building station to another and comprising, a hollow housing having an opening therein for placement around the external surface of a component characterized in that there is provided on the housing, two axially spaced sealing and gripping means for sealing against and gripping the external surface of the component to create an evacuation chamber bounded by said sealing and gripping means, the housing, and the component, and an air evacuation port in the housing located axially between the two sealing and gripping means for the ingress and egress of air to and from the evacuation chamber.

Preferably the annular sealing and gripping means comprise an elastomeric annular bladder which is deformable under pneumatic pressure to radially expand and contract.

Furthermore the annular bladder may have on its radially innermost surface an annular suction ring which is connectable to a vacuum source, and whereby the bladder can attach itself to the outer cylindrical surface of a carcass component.

Also according to this invention there is provided a method of transporting a cylindrical tire carcass component utilizing the above apparatus and including the steps of (a) locating the cylindrical housing concentrically with a cylindrical tire component on a first cylindrical drum, (b) introducing air pressure into the bladders to cause them to deform radially inwards to grip the outer surface of the component, (c) removing air from the annular space between the component and the inner surface of the housing, and releasing the component from the drum, (d) transporting the component to and placing it concentrically around a second cylindrical drum, (e) collapsing the bladders radially outwardly by reducing the air pressure therein and releasing the vacuum from around the component to deposit the component on the drum, and (f) removing the housing from the drum.

The invention will be described by way of example and with reference to the accompanying drawings in which;

FIG. 1 is a longitudinal section through a transfer apparatus according to this invention and which illustrates only one half of the apparatus above its longitudinal center line L—L, and which also shows the loaded and empty conditions on each side of the axial center line X—X.

FIG. 2, FIG. 3, FIG. 4, and FIG. 5 are schematic drawings illustrating the use of the transfer apparatus in FIG. 1 for transporting a tire carcass component from one building station to another building station.

Figure 1:
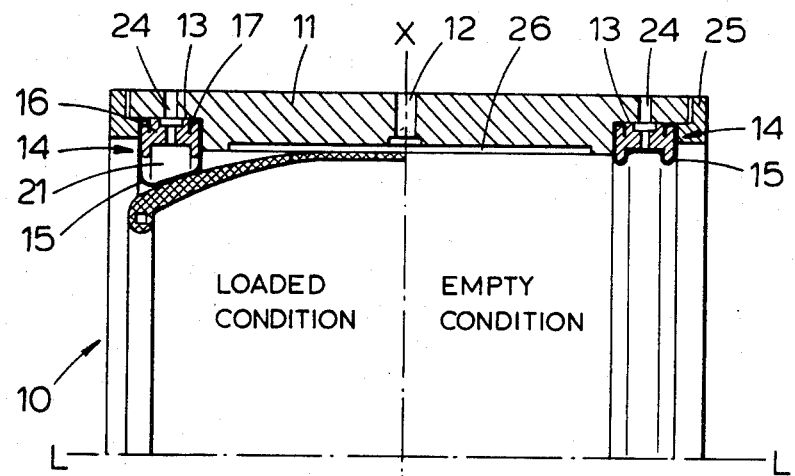
Figure 2:
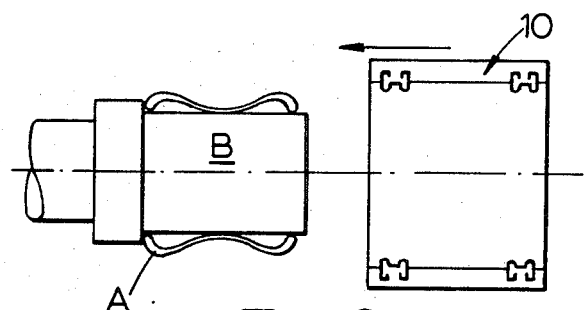
Figure 3:
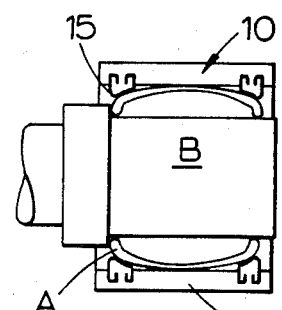

With reference to FIG. 1 there is illustrated a preferred transfer apparatus 10 for picking up an uncured first stage substantially cylindrical tire carcass band from a first stage tire carcass band building drum and transferring the carcass band to a second stage tire building and shaping drum. The apparatus is symmetrical about an axial center line X—X, and a longitudinal center line L—L.

At the first stage building drum the carcass band may comprise inner liner, carcass plies, apex strips, beads and sidewall. Sometimes the carcass plies and sidewalls have been turned around the beads. At the second stage building drum the carcass is formed into a toroidal shape and the breaker belts and treads are added.

The transfer apparatus 10 which can form a substantially air tight chamber with a carcass placed therein, comprises a cylindrical air tight housing 11 having an air pressure and vacuum port 12 located at its axial center line X—X. The radially inner surface of the housing 11 has recessed end portions 13 adjacent each end opening for receiving a pair of axially spaced radially deformable annular sealing and gripping means 14. The two sealing and gripping means 14 and their respective recessed end portions 13 are identical and only one will be described.

The terms 'axial' and 'axially' refer to displacements along the longitudinal axis L—L, and the terms 'radial' and 'radially' refer to displacements perpendicular to the axis L—L.

Figure 6:
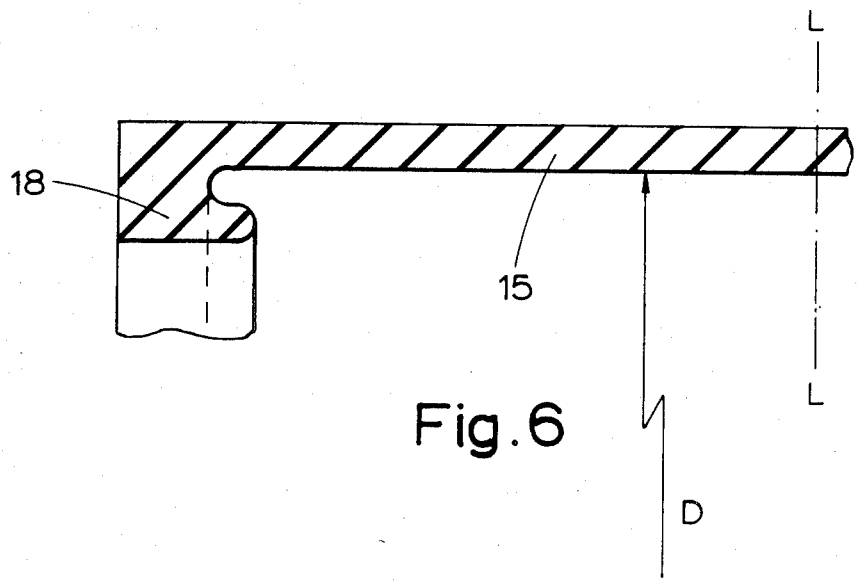
FIG. 6 is a part section through an annular sealing and gripping bladder of FIG. 1 in the as molded condition.
Figure 7:
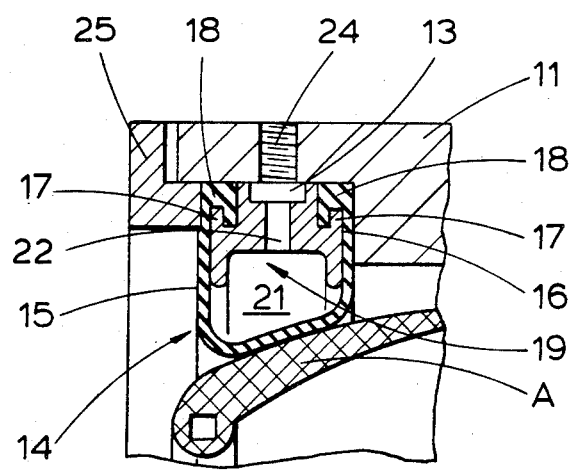
FIG. 7 is an enlarged detail of a portion of FIG. 1.

With reference now also to FIG. 6 and FIG. 7, each sealing and gripping means 14 comprises an elastomeric annular sealing bladder 15 formed from a full gum rubber compound or a polyurethane. The annular bladder 15 is molded inside-out at a smaller diameter D (approximately 10% smaller) than the smallest diameter to which the bladder must contract. The bladder 15 has a pair of beads 18, one located at each axial end and is mounted onto a support ring 16 to form and air tight chamber 21 between itself and the support ring 16. The support ring 16 has grooves 17 in its radially outer surface in which the beads 18 are located and is 'U' shaped in radial cross section (that is radial with respect to the ring) and has its open cavity 19 facing radially inwardly so that the bladder 15 can collapse into the cavity 19.

An air passageway 22 connects the chamber 21 within the bladder with a second air passageway 24 in the recessed portion 13 of the housing to allow air to be delivered to, or evacuated from the chamber 21.

The support ring 16 and bladder 15 are held in position in the recessed portion 13 by an end ring 25 which clamps the support ring in position so that the bladder beads 18 make an air tight seal with the inner surface of the recessed portion 13.

The support rings 16, associated bladder 15 and the end rings 25 can be used on housings 11 which can vary in axial length but have the same diameter.

The internal surface of the housing 11 is covered in a non-stick layer 26, for example a PVC rough surface material known as Ammeraal-Adams belt type super grip 2T035, which allows a quick release of a tire carcass.

With reference now to FIGS. 2 to 5, an uncured tire carcass band A has been assembled on a radially expandable first stage band building drum B which has been partially collapsed to release the carcass band A. The transfer apparatus 10 (of FIG. 1) is coaxially aligned with the band building drum B and is moved over the drum B until its axial center coincides with the center line of the carcass A. During this movement the bladders 15 are collapsed into the support rings 16 by the aid of vacuum in chamber 21. This is illustrated in the right hand half of FIG. 1.

When the transfer apparatus 10 is concentric with drum B the sealing bladders 15 are inflated by the introduction of air pressure into chamber 21 and expand radially inwardly onto the carcass band A adjacent its beads. The bladders 15 each seal against a continuous annular band of the outer peripheral surface of the carcass band A and grip and support the carcass at that place. The air between the carcass band A and the housing 11 of the apparatus 10 is withdrawn via the vacuum port 12 and the axial center portion of the carcass is shaped radially outwardly by atmospheric pressure into a barrell-like preshaped condition, as illustrated in the left hand half of FIG. 1 and in FIG. 3, in which it may contact the non-stick surface 26.

Figure 4:
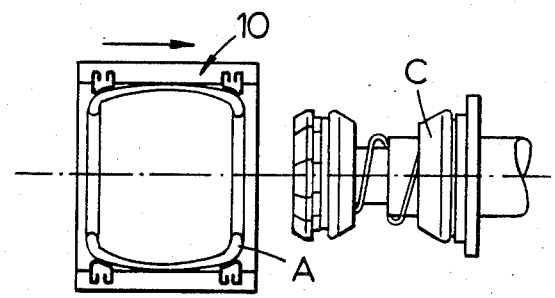
Figure 5:
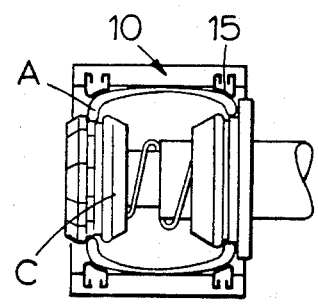

The transfer apparatus 10 with the carcass band A in place now moves towards a second stage building and forming drum C (FIG. 4). With the carcass band A in the preshaped condition it can be placed directly over the second stage drum C and is passed over the drum until the center line of the apparatus is in alignment with the center line of the drum C (FIG. 5). The second stage drum is expanded to located on the beads of the carcass band A, and at the same time the vacuum to the port 12 is cut off and the sealing bladders 15 are collapsed upwards under vacuum applied in chamber 21 releasing the carcass band A. The transfer apparatus can now return for reloading.

Figure 8:
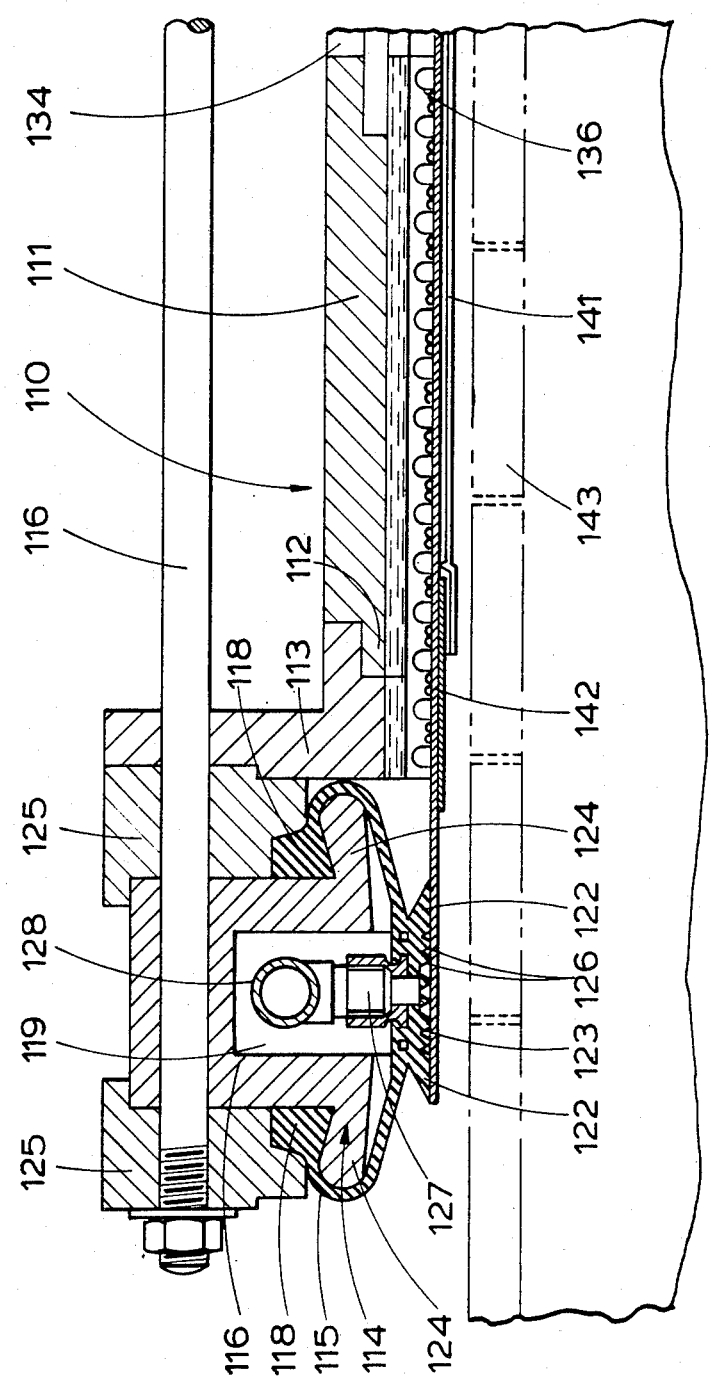
FIG. 8 is a longitudinal section through a transfer apparatus according to a second embodiment of the invention.

With reference now to FIG. 8, there is illustrated part section through a second transfer apparatus 110 which is the preferred embodiment for picking up a cylindrical tire carcass component, or assembly of components, which have very little inherent strength, for example an inner liner or an inner liner and carcass ply.

The transfer apparatus 110 has a cylindrical housing 111 having a stepped-off portion 112 at each axial end thereof, for receiving a radially outwardly extending annular end flange 113. The housing 111 has a vacuum port 134 located at its axial center and a non-stick liner 136 on its inner surface. A pair of annular sealing and gripping means 114 are located one at each axial end of the housing 111 and are each held between a pair of annular clamping rings 125. The clamping rings 125, and the sealing and gripping means 114 are secured at each end of the housing 111 to an end flange 113 by an array of circumferential spaced tie bars 116 which extend axially between two pairs of clamping rings 125.

The annular sealing and gripping means 114 each comprise an elastomeric annular sealing bladder 115 mounted onto a support ring 116. The support ring 116 is substantially 'U' shaped in radial cross-section having an open cavity 119 facing radially inwards, and a pair of axial flanges 124 adjacent the mouth of the cavity 119 which serve to secure the bladder 115 in position.

The cavity 119 is connected to a vacuum/air pressure source for expansion and contraction of the bladder 115.

The sealing bladder 115 has a pair of beads 118 which locate between a respective flange 124 and a clamping ring 125 to seal the bladder 115 against the support ring 116 and make the chamber 119 air tight. The radially inner surface 123 of the bladder is formed as a suction ring having axially spaced flexible annular sealing lips 122 with circumferential ribs 126 therebetween. The suction ring 123 is connected to a vacuum source (not shown) via a hollow insert 127 which is located in the cavity and connects through the wall of the bladder 118 with the suction ring 123. The insert 127 is secured to a flexible tube 128 also located in the cavity 119 and which connects with a vacuum source. Hence the vacuum to the sealing ring 123 can operate independently of the vacuum/air pressure in the cavity 119.

An inner liner 141 and perhaps a carcass ply 142 are wound onto a solid cylindrical tire carcass band forming drum 143, to form a cylindrical carcass component having an internal diameter that may be 2 to 2 and ½% smaller than the diameter of the building drum of the next stage of the operation. As previously described with reference to FIGS. 2 to 5 the transfer apparatus moves over the drum 143 until the center line of the drum is aligned with the center line of the cylindrical component. Air pressure is then introduced into the chamber 119 to cause the bladders 115 to radially contract onto the component 142. Simultaneously, or subsequently vacuum is applied to the suction ring 123 to cause it to adhere to the external surface of the cylindrical component 142. Vacuum is now applied to the chamber 119 to cause the bladder 115 to deform radially outwardly and thereby lift the carcass component away from the drum 143. Simultaneously, air is withdrawn from the annular space between the housing 111 and the outside of the carcass component to also lift the carcass away from the drum. This operation may be assisted by also blowing air through from the center of the drum 143.

The cylindrical component can now be transferred to another drum as described previously for FIGS. 2 to 5 and the carcass is released on the other drum by introducing air pressure into the suction ring 123, and into the port 134. The elastic memory of the carcass component will cause it to contract onto the drum to which it has been transported.

Whilst the invention has been described with reference to the specific examples illustrated and described, it is to be understood that minor changes could be made without departing from the spirit and scope of the invention. For example, the sequence of the application of inflation pressures, and/or vacuum to the bladders 15, and the vacuum port 12, may be altered.

I claim:

1. A method of transporting a cylindrical tire carcass component in which there is utilized a transfer apparatus having a hollow housing with two axially spaced annular sealing and gripping bladders mounted thereon, said method comprising the steps of
   (a) locating the housing concentrically with a cylindrical tire component on a first cylindrical drum,
   (b) introducing air pressure into the bladders to cause them to expand radially inwards to grip and seal against the outer surface of the component,
   (c) removing air from the annular space between the component, the inner surface of the housing, and the two bladders and then releasing the component from the drum,
   (d) transporting the component to and placing it concentrically around a second cylindrical drum,
   (e) collapsing the bladders radially outwardly by reducing the air pressure therein then releasing the vacuum from around the component to deposit the component on the drum, and
   (f) removing the housing from the drum.

2. A method as claimed in claim 1 when utilizing apparatus having an annular suction ring on the radially intermost surface of each gripping means, said suction ring being connected to a vacuum source for attachment to the outer surface of the component, and including the steps of evacuating air from the suction ring to attach said bladders to the outer surface of the component from the first cylindrical drum, and introducing air into the suction ring to release the bladders from the component at the second cylindrical drum.

3. A method as claimed in claim 2 and including the further step of causing the bladders to deform radially outwardly by evacuating air therefrom, when the carcass component is released from the first cylindrical drum.

4. A transfer apparatus for the transfer of an uncured tire component comprising:
   a hollow housing having an opening therein for placement around the external surface of a component, two axially spaced bladder means each separately mounted on the housing for sealing against and for gripping movement toward the external surface of the component to create an evacuation chamber bounded by said bladder means, the housing and the component, and means to evacuate the chamber located axially between the bladder means for the ingress and egress of air from said evacuation chamber.

5. Apparatus as claimed in claim 1 characterized in that each sealing and gripping means comprise an elastomeric annular bladder which is radially expandable and contractible under air pressure..

6. Apparatus as claimed in claim 5 characterized in that the elastomeric bladder is mounted onto a support ring whereby it is attached to the hollow housing, said support ring having at least one air passage way therein for supply of air pressure to said bladder.

7. Apparatus as claimed in claim 6 characterized in that the support ring is mounted in a recess on the internal surface of the housing.

8. Apparatus as claimed in claim 6 characterized in that the support ring is mounted between two clamp rings whereby it is attached to the housing.

9. Apparatus as claimed in one of claims 6, 7, or 8, characterized in that said bladder also acts as a seal between the support ring and the member on which the support ring is mounted to prevent leakage into/or from the bladder.

10. Apparatus as claimed in any one of claims 5 to 8 characterized in that the annular bladder has on its radially innermost surface an annular suction ring which is connectable to a vacuum source, and whereby the bladder can attach itself to the outer cylindrical surface of a carcass component.

11. Apparatus as claimed in claim 10 characterized in that the annular suction ring is connected to a vacuum source by means of a hollow insert held in the radially inner portion of the bladder, said insert being connected via a flexible tube to a vacuum/pressure source.

12. Apparatus as claimed in any one of claims 1 to 8 characterized in that the housing is a cylindrical housing having an opening at each thereof, and the sealing and gripping means are each located adjacent an opening for sealing and supporting a continuous annular band of the outer peripheral surface of a cylindrical component.

* * * * *